United States Patent
Sinha et al.

(10) Patent No.: US 10,805,417 B2
(45) Date of Patent: Oct. 13, 2020

(54) ENHANCED DOMAIN NAME SYSTEM RESPONSE CACHING

(71) Applicant: Charter Communications Operating, LLC, St. Louis, MO (US)

(72) Inventors: Ashutosh Kumar Sinha, Centennial, CO (US); Robert Dianda, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 11 days.

(21) Appl. No.: 16/296,396

(22) Filed: Mar. 8, 2019

(65) Prior Publication Data

US 2020/0287985 A1    Sep. 10, 2020

(51) Int. Cl.
*H04L 29/08* (2006.01)
*H04L 29/06* (2006.01)
*H04L 29/12* (2006.01)
*G06F 16/2455* (2019.01)

(52) U.S. Cl.
CPC .... *H04L 67/2842* (2013.01); *G06F 16/24552* (2019.01); *H04L 61/1511* (2013.01); *H04L 67/42* (2013.01)

(58) Field of Classification Search
CPC ........... H04L 29/12066; H04L 61/1511; H04L 61/6009; H04L 67/28; H04L 67/30; H04L 67/2842; H04L 67/42; G06F 16/24552
USPC ...................................................... 709/213
See application file for complete search history.

(56) References Cited

U.S. PATENT DOCUMENTS

| | | | | |
|---|---|---|---|---|
| 7,840,699 B2* | 11/2010 | Fujita | ................ | H04L 29/12066 709/238 |
| 8,463,915 B1* | 6/2013 | Kim | .................... | H04L 67/1036 709/227 |
| 10,142,282 B2* | 11/2018 | Chan | .................... | H04L 61/1511 |
| 2010/0274970 A1* | 10/2010 | Treuhaft | ............. | H04L 61/3025 711/118 |
| 2013/0198269 A1* | 8/2013 | Fleischman | ............. | H04L 61/20 709/203 |
| 2017/0054681 A1* | 2/2017 | Vilenski | ............... | H04L 61/1552 |
| 2018/0191672 A1* | 7/2018 | Torres | ..................... | H04L 67/28 |

* cited by examiner

*Primary Examiner* — Ruolei Zong
(74) *Attorney, Agent, or Firm* — Young Basile Hanlon & MacFarlane, P.C.

(57) ABSTRACT

Methods and systems for enhanced domain name system (DNS) response caching are described. An enhanced DNS response caching method includes receiving a connection request for a fully qualified domain name (FQDN). A DNS client checks a local cache for a cached resolved domain name corresponding to the FQDN and sends 3300 a query to obtain or refresh the cached resolved domain name if a Time to Live parameter is expired or about to expire. In response to receiving a negative response or no response for the query, the DNS client determines whether an enhanced DNS response caching parameter is enabled. If the enhanced DNS response caching parameter is enabled, the DNS client sends an expired cached resolved domain name to process the connection request.

18 Claims, 6 Drawing Sheets

ENHANCED DOMAIN NAME SYSTEM RESPONSE CACHING

TECHNICAL FIELD

This disclosure relates to the domain name system (DNS). More specifically, this disclosure relates to processing of negative responses or failure to receive a response from a DNS server.

BACKGROUND

The domain name system (DNS) is a hierarchical and decentralized naming system for computers, services, or other resources connected to the Internet or a private network. The DNS assigns domain names to Internet Protocol (IP) addresses. The DNS utilizes a client-server architecture. The DNS includes DNS servers and DNS clients. The DNS servers store and manage information about domains, domain names and the like. The DNS clients or resolvers determine domain name servers (i.e. the IP addresses) responsible for a domain name requested by a user, application or the like. The DNS clients include a local cache to store resolved IP addresses that are valid for a length of time defined by a Time to Live (TTL) parameter. Upon expiry of the TTL, the cached resolved IP addresses are flushed. The TTLs are provided by the DNS server along with the resolved IP addresses. The DNS uses local caches to improve efficiency, reduce the DNS traffic and increase performance of the applications. However, there are instances when the DNS architecture result is unacceptable. For example, when an application requests connection to a domain name, the DNS client checks if there is a cached resolved domain name response for the requested domain name in the local cache. If the cached resolved domain name response has expired or needs to be refreshed, the DNS clients sends out a query to a DNS server. If the DNS server does not send a response or sends a negative response, then the connection will fail since any expired cached resolved domain name response has been flushed. In many applications, such as for example a telephony application, a connection failure is an unacceptable result.

SUMMARY

Disclosed herein are methods and systems for enhanced domain name system (DNS) response caching. An enhanced DNS response caching method includes receiving a connection request for a fully qualified domain name (FQDN). A DNS client checks a local cache for a cached resolved domain name corresponding to the FQDN and sends 3300 a query to obtain or refresh the cached resolved domain name if a Time to Live parameter is expired or about to expire. In response to receiving a negative response or no response for the query, the DNS client determines whether an enhanced DNS response caching parameter is enabled. If the enhanced DNS response caching parameter is enabled, the DNS client sends an expired cached resolved domain name to process the connection request.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for enhanced domain name system (DNS) response caching. DNS clients are provided a mechanism for handling DNS negative responses or no responses when a cached resolved domain name response has expired. Negative responses may occur, for example, when a DNS zone file gets corrupted or DNS server is not behaving as expected. The mechanism may provide a fault tolerant technique for handling negative response, no responses, DNS server failure and the like. The mechanism may improve user experience, reduce failure scenarios due to DNS issues and provide enhanced DNS operability.

In an implementation, a DNS client includes a parameter or flag which may be enabled or disabled. When the parameter is disabled, the DNS client may store the resolved domain name response until a Time to Live (TTL) value specified by the DNS server and may flush the resolved domain name response once the TTL has expired. When the parameter is enabled, the DNS client may store the resolved domain name response beyond the TTL value specified by the DNS server until the DNS server responds with a positive response. This positive response may be used to overwrite the expired cached resolved domain name response. In the instance when the parameter is enabled, if the TTL expires, the DNS client may attempt to refresh the expired cached resolved domain name response. In this fashion, the TTL value retains its importance as decided by the DNS server.

In an implementation, an enhanced DNS response caching parameter may be set to disabled as a default setting by a DNS client. If the DNS client recognizes a certain type of application or request, the DNS client may enable the enhanced DNS response caching parameter. For example, it may be mission critical for certain types of applications to complete a connection regardless of the validity, applicability or appropriateness of the IP address.

In an implementation, an enhanced DNS response caching parameter may be set to enabled as a default setting by a DNS client. If the DNS client recognizes a certain type of application or request, the DNS client may disable the enhanced DNS response caching parameter. For example, the value of the cached resolved domain name response may change frequently for some applications and therefore the cached resolved domain name response should not be used beyond expiration of the TTL.

In an implementation, a DNS client may set an enhanced DNS response caching parameter dependent on the type of application or request. In some instances, the value of the cached resolved domain name response may change infrequently (frequently) for some applications and therefore the cached resolved domain name response may (may not) be used beyond expiration of the TTL.

Figure 1:
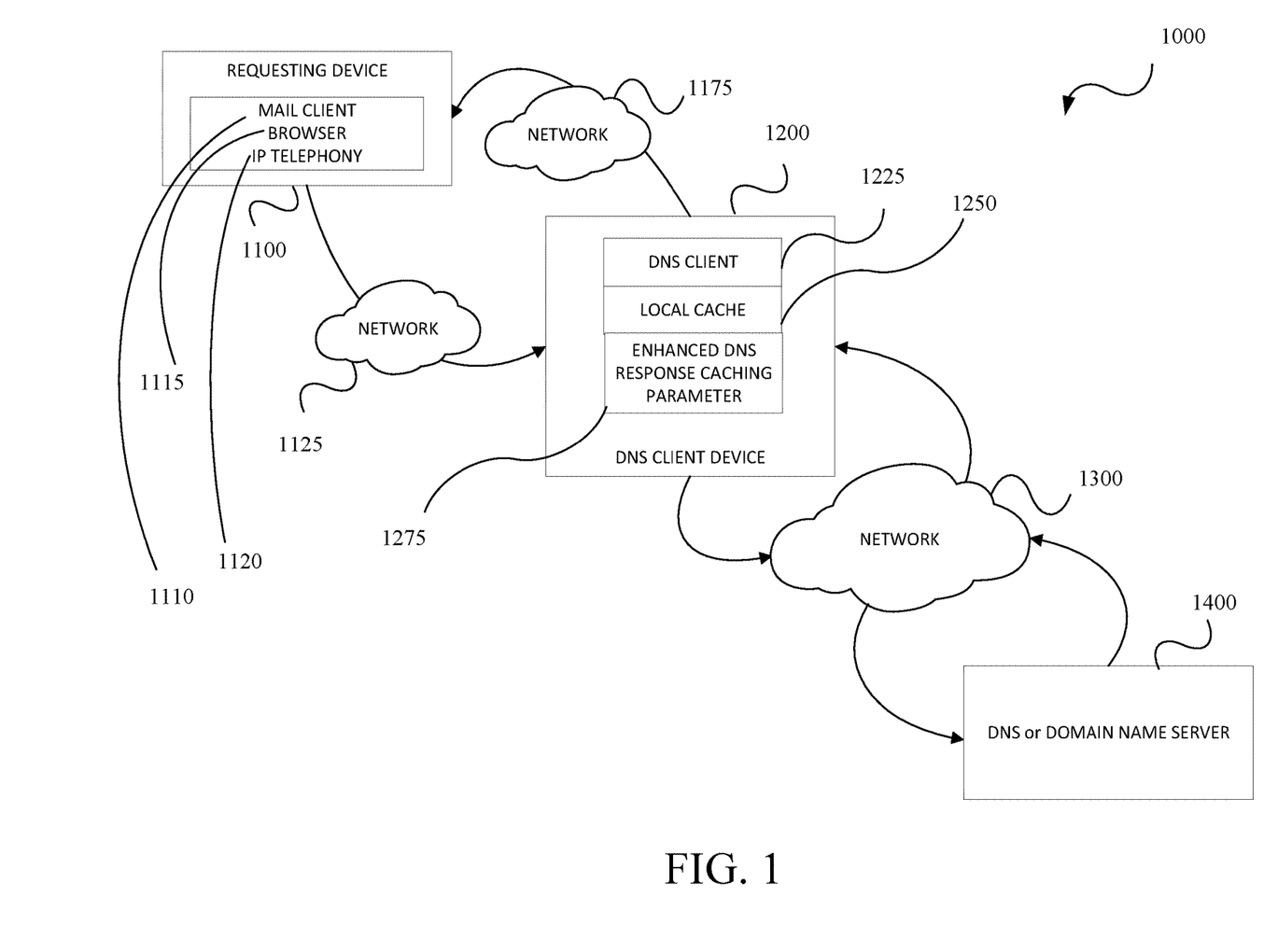
FIG. 1 is a diagram of an example architecture with a domain name system (DNS) in accordance with embodiments of this disclosure.

FIG. 1 is a diagram of an example architecture 1000 using a domain name system in accordance with embodiments of this disclosure. In an implementation, the architecture 1000 may include a requesting device 1100 connected to or in communication with (collectively "connected to") a DNS client device 1200. In an implementation, the connection between the requesting device 1100 and the DNS client device 1200 may be through a network 1125 and a network 1175, where network 1125 and a network 1175 may be one network. The DNS client device 1200 is connected to a network 1300, which in turn is connected to a DNS server 1400. The connections between the requesting device 1100, the DNS client device 1200, the network 1300 and the DNS server 1400 may be wired, wireless or a combination thereof. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The requesting device 1100 may be, but is not limited to, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets and the like. For example, in an implementation, the requesting device 1100 may include applications such as, but not limited to, a mail application 1110, a web browser application 1115, an IP telephony application 1120 and the like.

The DNS client device 1200 may be, but is not limited to, a router, Internet Service Provider (ISP) system, access point device, network devices, and the like. In an implementation, the DNS client device 1200 may include a DNS client or resolver 1225, a local cache 1250 and an enhanced DNS response caching parameter 1275. The DNS client 1225 or DNS client software may be built into most devices or machines that have transmission control protocol/Internet protocol (TCP/IP) installed and enables the devices or machines (such as the DNS client device 1200) to issue DNS queries to DNS servers (such as the DNS server 1400). The local cache 1250 may be configured to store DNS domain name responses including, for example, the resolved IP address. In an implementation, the local cache may store a resource record (RR) which includes a fully qualified domain name (FQDN), TTL and other DNS relevant information. As described herein, the enhanced DNS response caching parameter 1275 may be a configurable parameter or flag that may be used by the DNS client device 1200 to use expired cached resolved domain name responses for certain applications when DNS servers return negative response or fail to respond. In an implementation, the enhanced DNS response caching parameter 1275 may be applicable to all cached resolved domain name responses stored in the local cache 1250. In an implementation, the enhanced DNS response caching parameter 1275 may be applicable to certain types of cached resolved domain name responses stored in the local cache 1250. In an implementation, the enhanced DNS response caching parameter 1275 may be applicable per cached resolved domain name response stored in the local cache 1250, i.e., on a one-to-one basis.

The DNS server 1400 may be, but is not limited to, a root domain server, a root name server, domain server, name server, and other like servers that contain databases of public IP addresses and their associated hostnames or domain names, and serve to resolve, or translate, those hostnames or domain names to IP addresses as requested.

The network 1125, network 1175 and the network 1300 may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof. In an implementation, each network 1125, 1175 and 1300 may contain one or more DNS servers, network elements or devices, and the like.

Operationally, the requesting device 1100 sends a connection request including a FQDN using the mail application 1110, the web browser application 1115, or the IP telephony application 1120, for example. In an implementation, this may be sent via network 1125. The DNS client device 1200 may receive and check the FQDN against cached resolved domain name response in the local cache 1250. If the cached resolved domain name response has expired or needs to be refreshed, the DNS clients sends out a query to a DNS server 1400 to obtain or refresh the domain name response. In an implementation, this may be sent via network 1300. In this instance, the DNS server 1400 sends a negative response or fails to send a response. For example, the negative response may be a NXDOMAIN message. The DNS client 1200, by using one or more of the enhanced DNS response caching parameter techniques described with respect to FIGS. 3-5, maintains or retains the cached resolved domain name response until the DNS server 1400 provides a positive response, such as for example, a resolved domain name. By not flushing the expired cached resolved domain name, the DNS client 1200 may complete the connection request with at least some form of domain name response.

The enhanced DNS response caching parameter and associated techniques allow for completion of a connection request without affecting the importance of the TTL values imparted by the DNS servers. TTL values may affect the amount of query volume that is attributable to DNS servers and any changes may result in longer than expected change propagation to all users. The techniques continue to use the TTL values to refresh cached resolved domain names at the appropriate times. That is, the enhanced DNS response caching parameter and associated techniques are transparent to the DNS servers.

Figure 2:
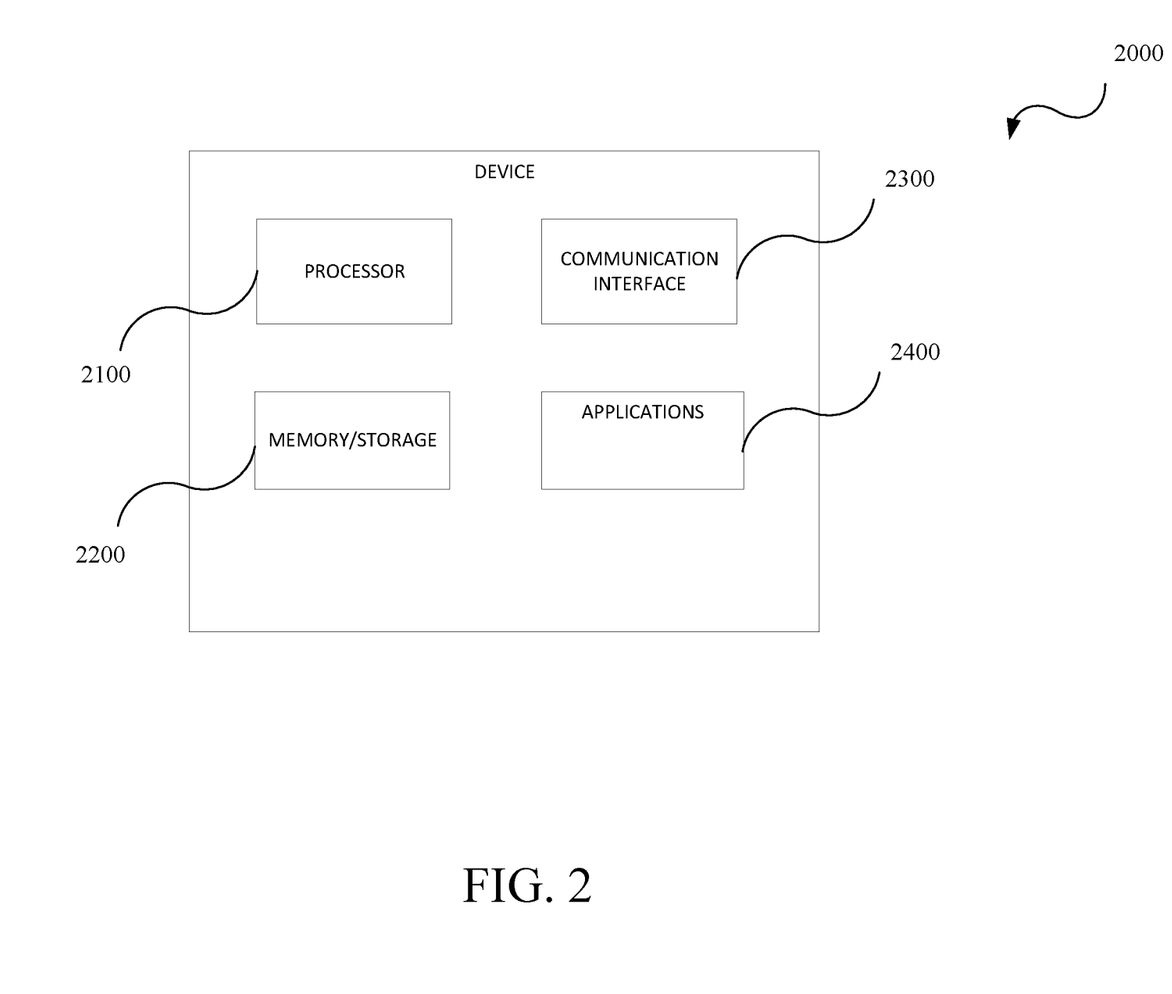
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, and applications 2400. The device 2000 may include or implement, for example, the requesting device 1100, the DNS client device 1200, and the DNS server 1400, for example. In an implementation, the memory/storage 2200 may include the local cache 1250 and store the enhanced DNS response caching parameter 1275 of the DNS client device 2000. The enhanced DNS response caching parameter techniques or methods described herein may be stored in the memory/storage 2200 and executed by the processor 2100 in cooperation with the memory/storage 2200, the communications interface 2300, and applications 2400, as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
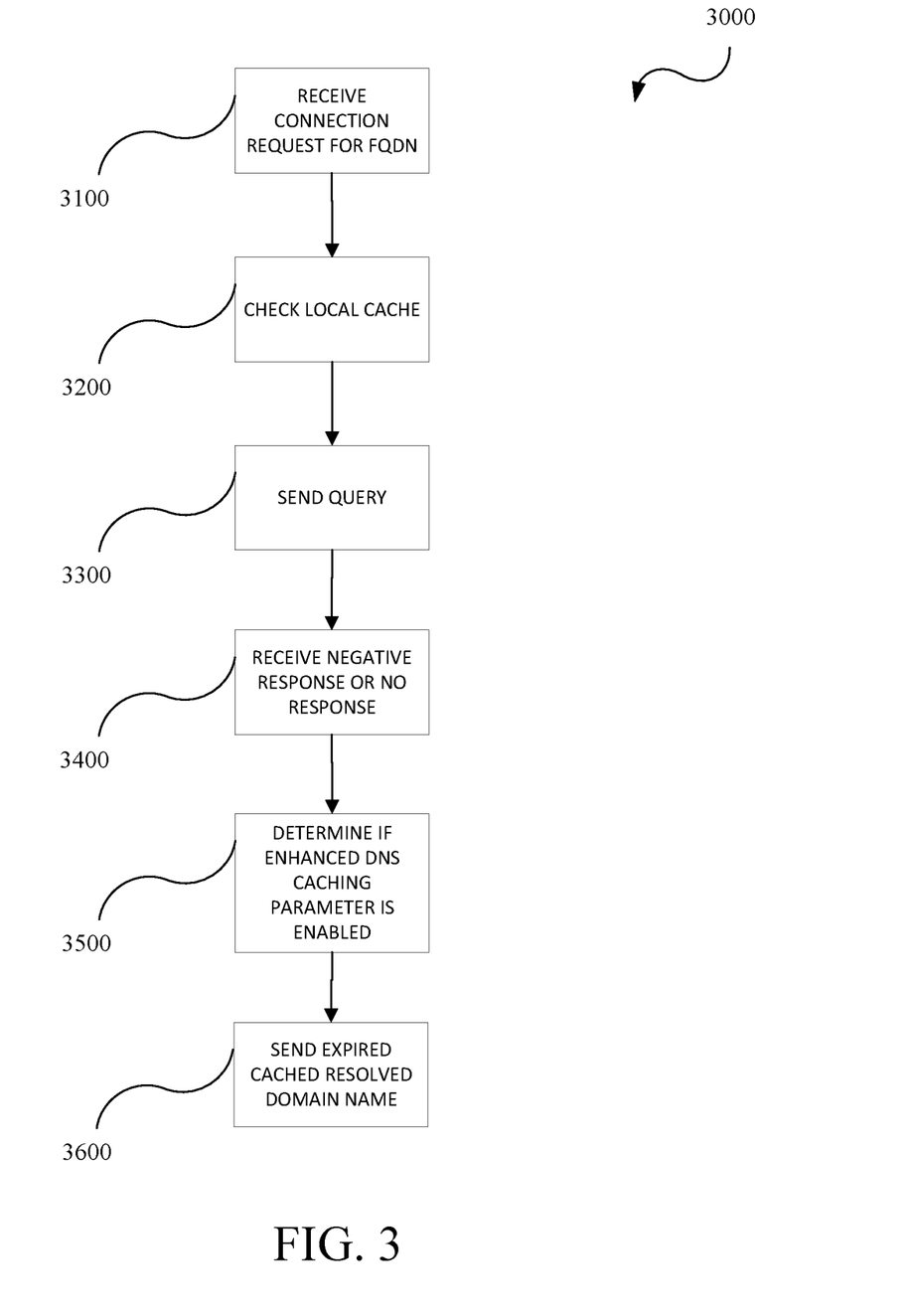
FIG. 3 is a flowchart of an example method for enhanced DNS response caching in accordance with embodiments of this disclosure.

FIG. 3 is a flowchart of an example method 3000 for enhanced DNS response caching in accordance with embodiments of this disclosure. The method 3000 includes: receiving 3100 a connection request for a FQDN; checking 3200 a local cache for a cached resolved domain name corresponding to the FQDN; sending 3300 a query to obtain or refresh the cached resolved domain name; receiving 3400 a negative response or no response for the query; determining 3500 whether an enhanced DNS response caching parameter is enabled; and sending 3600 an expired cached resolved domain name to complete the connection request if the enhanced DNS response caching parameter is enabled. For example, the technique 3000 may be implemented, as applicable and appropriate, by the requesting device 1100, of FIG. 1, the DNS client device 1200 of FIG. 1, the DNS server 1400 of FIG. 1, the device 2000 of FIG. 2 and the processor 2100 of FIG. 2.

The method 3000 includes receiving 3100 a connection request for a FQDN. In an implementation, a DNS client may receive the connection request from a requesting device. In an implementation, a DNS client may receive the connection request from another DNS device that may not have the requested resolved domain name or IP address. The DNS client may be any device that issues DNS queries to DNS servers.

The method 3000 includes checking 3200 a local cache for a cached resolved domain name corresponding to the FQDN. In an implementation, the DNS client stores in the local cache resolved domain names provided by DNS servers, for example. The DNS client also stores the TTLs for the resolved domain names. In an implementation, the DNS client stores resource records for the resolved domain names. In an implementation, if a cached resolved domain name matches the requested FQDN and the TTL value has not expired, the DNS client sends the cached resolved domain name to complete the connection request.

The method 3000 includes sending 3300 a query to obtain or refresh the cached resolved domain name. In an implementation, a DNS client may send the query when none of the cached resolved domain names in the local cache match the requested FQDN. In an implementation, a DNS client may send a query when a cached resolved domain name matches the requested FQDN but has expired or is about to expire. In an implementation, a DNS client may send a query when a TTL value is expiring for a cached resolved domain name.

The method 3000 includes receiving 3400 a negative response or no response for the query. The negative response or no response occurs beyond the TTL value. In an implementation, the negative response may be a NXDOMAIN message. In an implementation, the negative response or no response may result from a corrupted DNS zone file, misbehaving or non-functional DNS server, loss of communication failure and the like.

The method 3000 includes determining 3500 whether an enhanced DNS response caching parameter is enabled. In an implementation, the DNS client may determine whether the enhanced DNS response caching parameter is enabled for the DNS client. For example, if a DNS client is on a telephony-based device, the enhanced DNS response caching parameter may be defaulted to enablement. In an implementation, the DNS client may determine whether the enhanced DNS response caching parameter is enabled using the requested FQDN. In an implementation, the DNS client may determine whether the enhanced DNS response caching parameter is enabled using the expired cached resolved domain name associated with the requested FQDN. In an implementation, the DNS client may determine whether the enhanced DNS response caching parameter is enabled using type of application associated with the requested FQDN. In an implementation, the determining 3500 may include setting the enhanced DNS response caching parameter based on the conditions, characteristics or types described herein.

The method 3000 includes sending 3600 an expired cached resolved domain name to complete the connection request if the enhanced DNS response caching parameter is enabled. The sending 3600 may include maintaining the expired cached resolved domain name in the local cache until a positive response is provided by the DNS server. The positive response may be a resolved domain name, a new TTL for the cached resolved domain name and the like. The sending 3600 may include overwriting or replacing the expired cached resolved domain name or overwriting or replacing the TTL value. In an implementation, the expired cached resolved domain name may be sent to a requesting device. In an implementation, a message may be sent using the expired cached resolved domain name to complete the connection request. In an implementation, a message may be sent using the expired cached resolved domain name to further process, enable or assist in completing the connection request.

Figure 4:
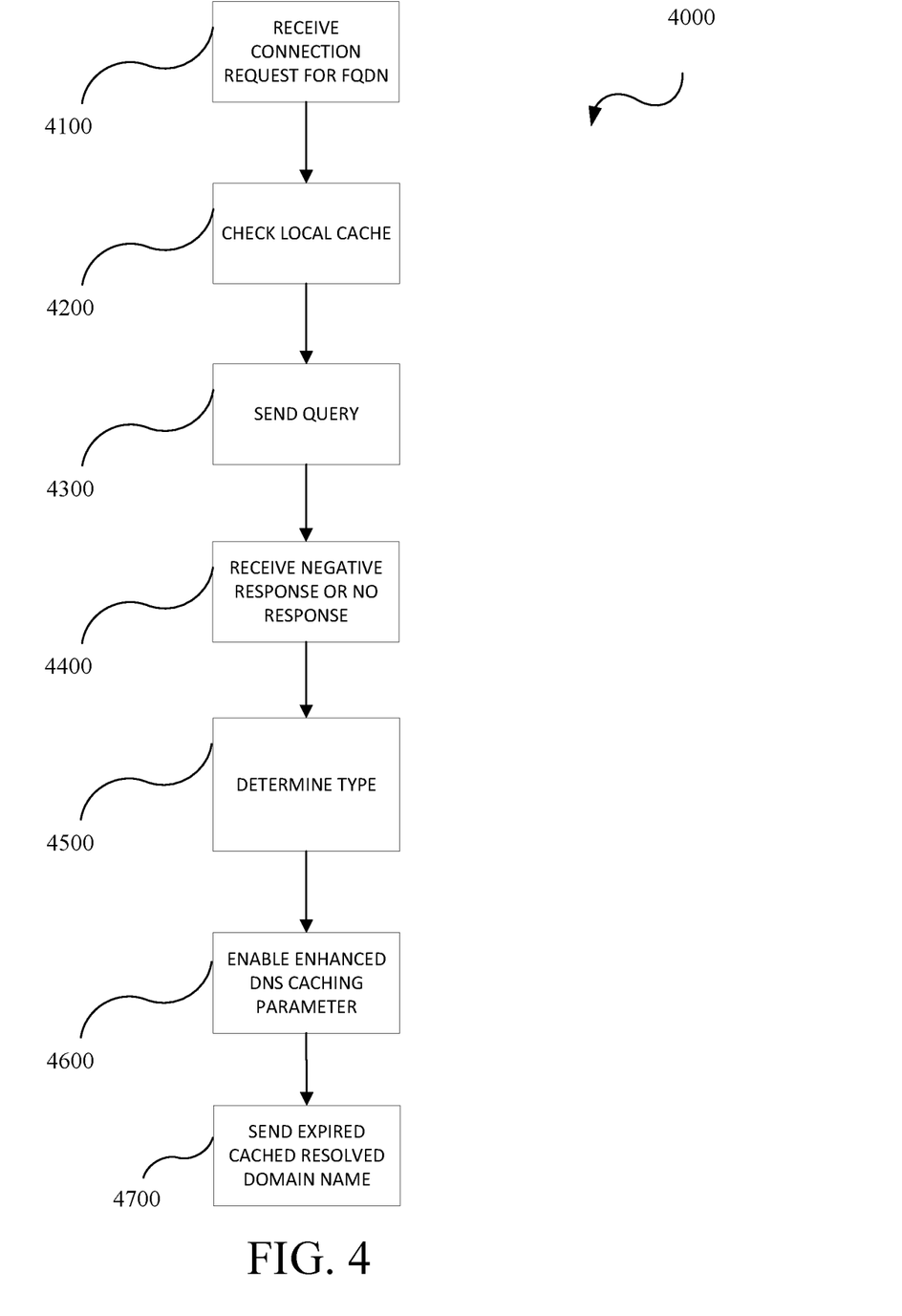
FIG. 4 is a flowchart of another example method for enhanced DNS response caching in accordance with embodiments of this disclosure.

FIG. 4 is a flowchart of an example method 4000 for enhanced DNS response caching in accordance with embodiments of this disclosure. The method 4000 includes: receiving 4100 a connection request for a FQDN; checking 4200 a local cache for a cached resolved domain name corresponding to the FQDN; sending 4300 a query to obtain or refresh the cached resolved domain name; receiving 4400 a negative response or no response for the query; determining 4500 a type associated with the connection request; enabling 4600 an enhanced DNS response caching parameter based on the type for the cached resolved domain name; and sending 4700 an expired cached resolved domain name to complete the connection request if the enhanced DNS response caching parameter is enabled. For example, the technique 4000 may be implemented, as applicable and appropriate, by the requesting device 1100, of FIG. 1, the DNS client device 1200 of FIG. 1, the DNS server 1400 of FIG. 1, the device 2000 of FIG. 2 and the processor 2100 of FIG. 2.

The method 4000 includes receiving 4100 a connection request for a FQDN. In an implementation, a DNS client may receive the connection request from a requesting device. In an implementation, a DNS client may receive the connection request from another DNS device that may not have the requested resolved domain name or IP address. The DNS client may be any device that issues DNS queries to DNS servers.

The method 4000 includes checking 4200 a local cache for a cached resolved domain name corresponding to the FQDN. In an implementation, the DNS client stores in the local cache resolved domain names provided by DNS servers, for example. The DNS client also stores the TTLs for the resolved domain names. In an implementation, the DNS client stores resource records for the resolved domain names. In an implementation, if a cached resolved domain name matches the requested FQDN and the TTL value has not expired, the DNS client sends the cached resolved domain name to complete the connection request.

The method 4000 includes sending 4300 a query to obtain or refresh the cached resolved domain name. In an implementation, a DNS client may send the query when none of the cached resolved domain names in the local cache match the requested FQDN. In an implementation, a DNS client may send a query when a cached resolved domain name matches the requested FQDN but has expired or is about to expire. In an implementation, a DNS client may send a query when a TTL value is expiring for a cached resolved domain name.

The method 4000 includes receiving 4400 a negative response or no response for the query. The negative response or no response occurs beyond the TTL value. In an implementation, the negative response may be a NXDOMAIN message. In an implementation, the negative response or no response may result from a corrupted DNS zone file, misbehaving or non-functional DNS server, loss of communication failure and the like.

The method 4000 includes determining 4500 a type associated with the connection request. In an implementation, the DNS client may determine the type based on the FQDN in the connection request. For example, the FQDN may be a telephony related site, an online game site, a financial site and the like. For example, the FQDN may be a site with a defined enhanced DNS response caching parameter setting. In an implementation, the DNS client may determine the type based on the type of application associated with the connection request, where an application has a defined enhanced DNS response caching parameter setting. In an implementation, the DNS client may determine a type based on the FQDN type in the connection request. For example, the FQDN type may be related to telephony, online games, financial institutions and the like, where the FQDN type has a defined enhanced DNS response caching parameter setting.

The method 4000 includes enabling 4600 an enhanced DNS response caching parameter based on the type for the connection request. In an implementation, a flag may be set (or unset). In an implementation, a bit in memory or the local cache may be set (or unset). In an implementation, a data structure or a field in a data structure may be set (or unset). In an implementation, a register or a field in a register may be set (or unset).

The method 4000 includes sending 4700 an expired cached resolved domain name to complete the connection request. The sending 4700 may include maintaining the expired cached resolved domain name in the local cache until a positive response is provided by the DNS server. The positive response may be a resolved domain name, a new TTL for the cached resolved domain name and the like. The sending 4700 may include overwriting or replacing the expired cached resolved domain name or overwriting or replacing the TTL value. In an implementation, the expired cached resolved domain name may be sent to a requesting device. In an implementation, a message may be sent using the expired cached resolved domain name to complete the connection request. In an implementation, a message may be sent using the expired cached resolved domain name to further process, enable or assist in completing the connection request.

Figure 5:
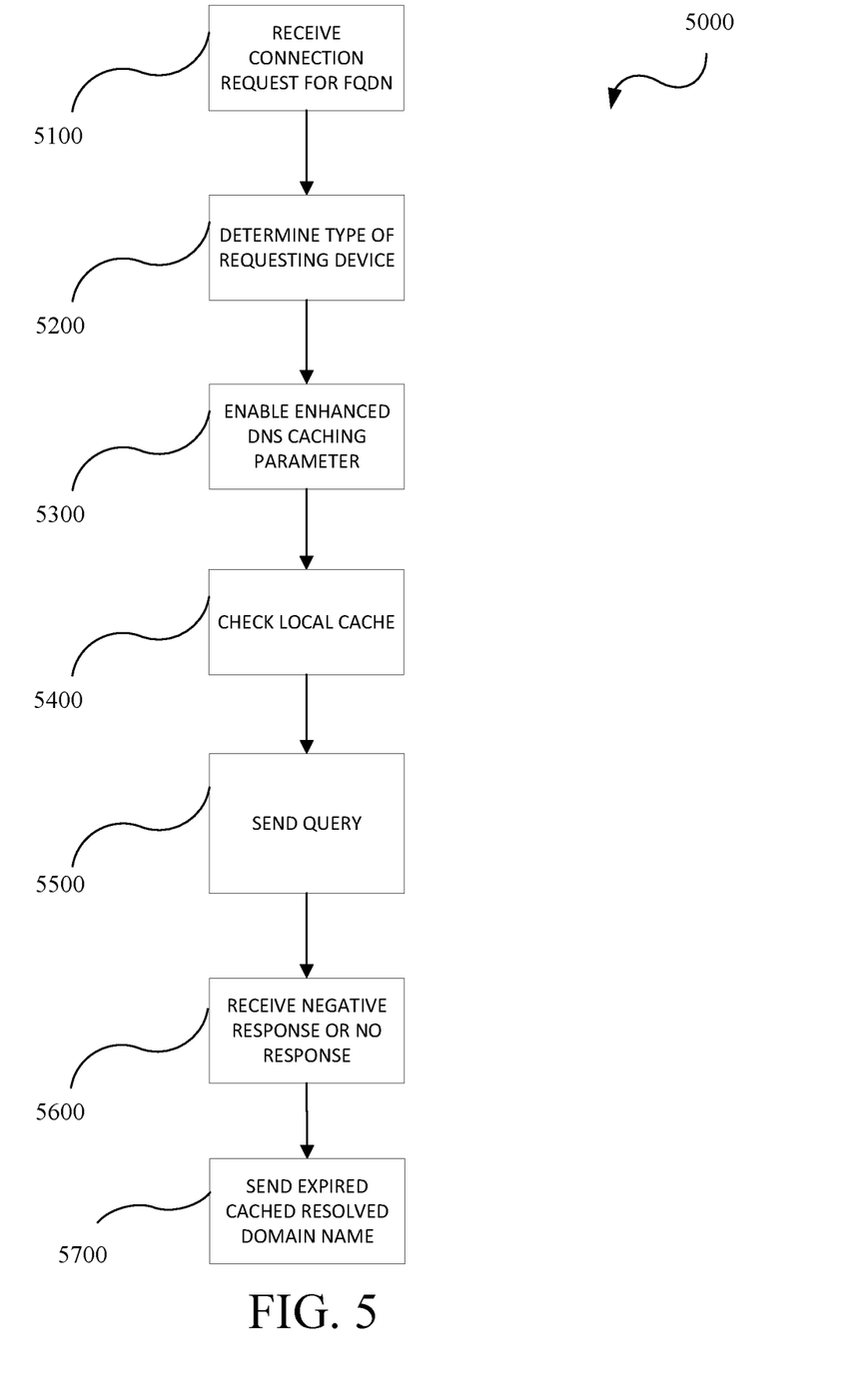
FIG. 5 is a flowchart of another example method for enhanced DNS response caching in accordance with embodiments of this disclosure.

FIG. 5 is a flowchart of an example method 5000 for enhanced DNS response caching in accordance with embodiments of this disclosure. The method 5000 includes: receiving 5100 a connection request for a FQDN; determining 5200 a type for the connection request; enabling 5300 an enhanced DNS response caching parameter based on the type; checking 5400 a local cache for a cached resolved domain name corresponding to the FQDN; sending 5500 a query to obtain or refresh the cached resolved domain name; receiving 5600 a negative response or no response for the query; and sending 5700 an expired cached resolved domain name to complete the connection request if the enhanced DNS response caching parameter is enabled. For example, the technique 5000 may be implemented, as applicable and appropriate, by the requesting device 1100, of FIG. 1, the DNS client device 1200 of FIG. 1, the DNS server 1400 of FIG. 1, the device 2000 of FIG. 2 and the processor 2100 of FIG. 2.

The method 5000 includes receiving 5100 a connection request for a FQDN. In an implementation, a DNS client may receive the connection request from a requesting device. In an implementation, a DNS client may receive the connection request from another DNS device that may not have the requested resolved domain name or IP address. The DNS client may be any device that issues DNS queries to DNS servers.

The method 5000 includes determining 5200 a type for a requesting device. In an implementation, the requesting device may be a telephony related device, an online game device, a smartphone and the like. For example, the requesting device type may have a defined enhanced DNS response caching parameter setting.

The method 5000 includes enabling 5300 an enhanced DNS response caching parameter based on the type. In an implementation, a flag may be set (or unset). In an implementation, a bit in memory or the local cache may be set (or unset). In an implementation, a data structure or a field in a data structure may be set (or unset). In an implementation, a register or a field in a register may be set (or unset).

The method 5000 includes checking 5400 a local cache for a cached resolved domain name corresponding to the FQDN. In an implementation, the DNS client stores in the local cache resolved domain names provided by DNS servers, for example. The DNS client also stores the TTLs for the resolved domain names. In an implementation, the DNS client stores resource records for the resolved domain names. In an implementation, if a cached resolved domain name matches the requested FQDN and the TTL value has not expired, the DNS client sends the cached resolved domain name to complete the connection request.

The method 5000 includes sending 5500 a query to obtain or refresh the cached resolved domain name. In an implementation, a DNS client may send the query when none of the cached resolved domain names in the local cache match the requested FQDN. In an implementation, a DNS client may send a query when a cached resolved domain name matches the requested FQDN but has expired or is about to expire. In an implementation, a DNS client may send a query when a TTL value is expiring for a cached resolved domain name.

The method 5000 includes receiving 5600 a negative response or no response for the query. The negative response or no response occurs beyond the TTL value. In an implementation, the negative response may be a NXDOMAIN message. In an implementation, the negative response or no response may result from a corrupted DNS zone file, misbehaving or non-functional DNS server, loss of communication failure and the like.

The method 5000 includes sending 5700 an expired cached resolved domain name to complete the connection request if the enhanced DNS response caching parameter is enabled. The sending 5700 may include maintaining the expired cached resolved domain name in the local cache until a positive response is provided by the DNS server. The positive response may be a resolved domain name, a new TTL for the cached resolved domain name and the like. The sending 5700 may include overwriting or replacing the expired cached resolved domain name or overwriting or replacing the TTL value. In an implementation, the expired cached resolved domain name may be sent to a requesting device. In an implementation, a message may be sent using the expired cached resolved domain name to complete the connection request. In an implementation, a message may be sent using the expired cached resolved domain name to further process, enable or assist in completing the connection request.

Figure 6:
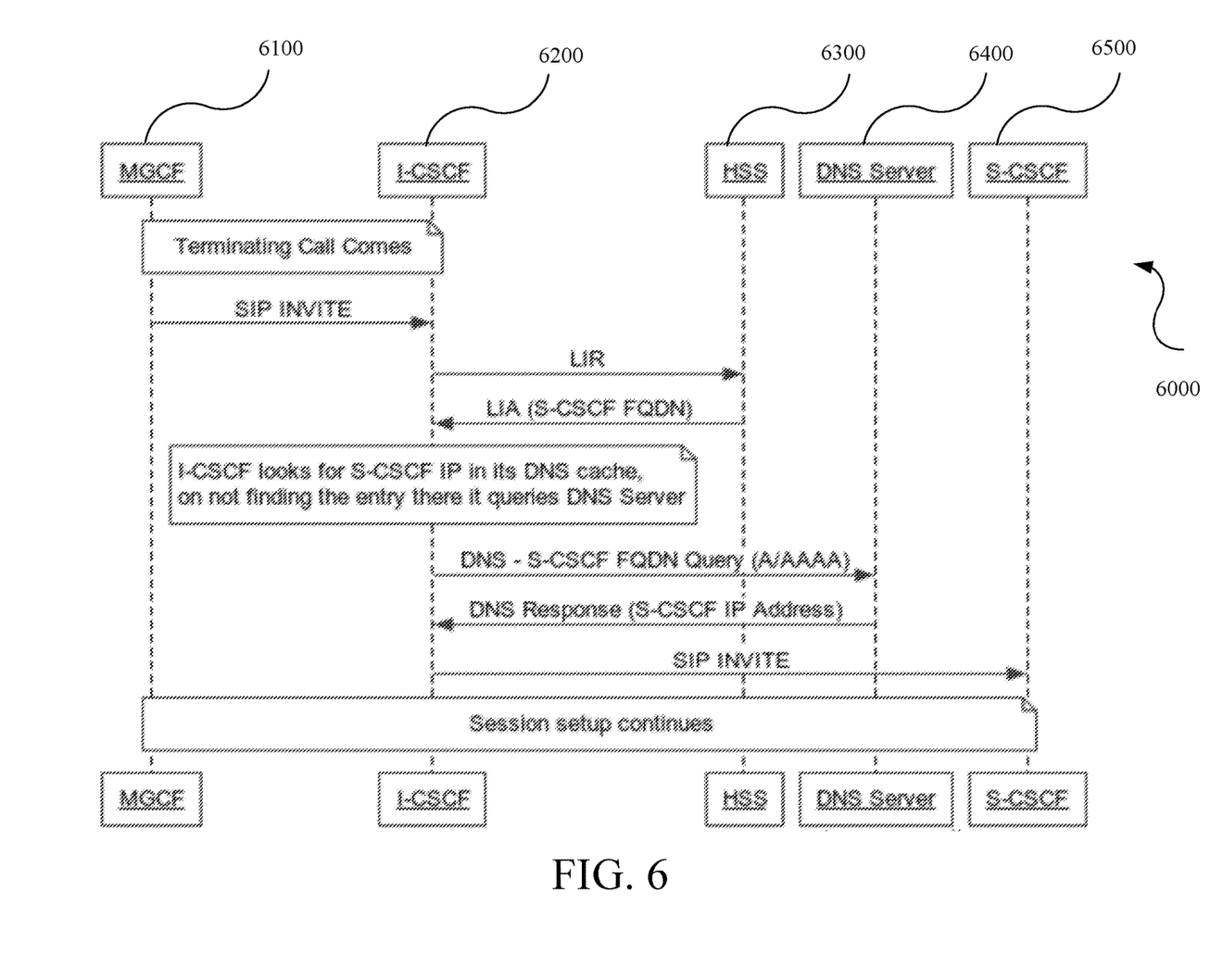
FIG. 6 is a block diagram of an example telephony architecture with a DNS client in accordance with embodiments of this disclosure.

FIG. 6 is a partial block diagram of an example telephony—IP Multimedia Subsystem (IMS) architecture 6000 with a DNS client in accordance with embodiments of this disclosure. The telephony-IMS architecture 6000 a Media Gateway Control Function (MGCF) 6100, an Interrogating—Call Session Control Function (I-CSCF) 6200, a Home Subscriber Server (HSS) 6300, a DNS server 6400, and a Serving—Call Session Control Function (S-CSCF) 6500.

Prior to implementation of the enhanced DNS response caching parameter techniques described herein, IMS elements that include a DNS client, cache DNS domain name responses with the TTL values specified by the DNS servers for requested FQDNs. If the DNS servers provide negative responses or fail to respond (as described herein above) after the TTL expires for the cached resolved domain name responses for a previously requested FQDN, then the IMS elements are unable to process the call and a connection failure occurs.

For example, assume that the IMS element with the DNS client is the I-CSCF 6200. When a terminating (break-in) call reaches the I-CSCF 6200 from the MGCF 6100, the I-CSCF 6200 does a diameter Cx:LIR query to the HSS 6300 to find the S-CSCF (e.g., S-CSCF 6500) responsible for the terminating subscriber (i.e. destination). The HSS 6300 replies with diameter Cx:LIA message containing the responsible S-CSCF FQDN. The I-CSCF 6200 then does a DNS query for this S-CSCF FQDN to determine the IP address so that the SIP:INVITE may be routed appropriately. If the DNS Server 6400 responds with the S-CSCF IP address, then the I-CSCF 6200 can route the request and the call processing continues. The I-CSCF 6200 caches the resolved domain name response from the DNS server 6400 for the length of time defined by the TTL value in a local cache. If no further DNS requests are made to the particular FQDN and the TTL expires, then the I-CSCF 6200 will flush the entry from the local cache.

In the instance that same FQDN is requested again, the I-CSCF 6200 checks the local cache. If the cached resolved domain name response is expired or about to expire, the I-CSCF 6200 sends a DNS query to the DNS server 6400. If the DNS server 6400 provides a negative response or fails to respond (as described herein above) after the TTL expires for the cached resolved domain name responses for a previously requested FQDN, then the IMS elements are unable to process the call and a connection failure occurs.

In an implementation where the I-CSCF 6200 includes the enhanced DNS response caching parameter techniques described herein, the I-CSCF 6200 will continue to cache the expired cached resolved domain name until a positive response is received and sends the expired cached resolved domain name to further process the connection request or sends a message using the expired cached resolved domain name to further process, enable or assist in completing the connection request.

In general, a method for enhanced domain name system (DNS) response caching includes receiving a connection request for a fully qualified domain name (FQDN). A local cache is checked for a cached resolved domain name corresponding to the requested FQDN and a query is sent to refresh a matching cached resolved domain name. If a negative response or no response is received for the query, it is determined whether an enhanced DNS response caching parameter is enabled. An expired matching cached resolved domain name is sent to process the connection request when the enhanced DNS response caching parameter is enabled. In an implementation, cached resolved domain names are stored in the cache for time to live values specified in resolved domain name responses. In an implementation, expired cached resolved domain names are maintained, until a positive response is received, when the enhanced DNS response caching parameter is enabled. In an implementation, the cached resolved domain names are refreshed when time to live values expire or are about to expire. In an implementation, the determination of enhanced DNS response caching parameter enablement uses a type of the requested FQDN. In an implementation, determination of enhanced DNS response caching parameter enablement uses a type of DNS client device. In an implementation, determination of enhanced DNS response caching parameter enablement uses a type of requesting device. In an implementation, determination of enhanced DNS response caching parameter enablement uses a type of application associated with the requested FQDN. In an implementation, a default setting for the enhanced DNS response caching parameter is enabled for certain application types, certain DNS client device types, certain types of requesting devices, certain FQDN types or combinations thereof.

In general, a method for processing requests with domain name system (DNS) response failures includes checking for a cached resolved Internet Protocol (IP) address corresponding to a domain name in a request. A type associated with the request is determined when a response failure occurs for a query related to an identified cached resolved IP address. A field based on the type is set to permit use of expired identified cached resolved IP address. An expired identified cached resolved IP address is sent to process the request. In an implementation, cached resolved IP addresses are stored in the cache for time to live values specified in resolved IP responses. In an implementation, expired cached resolved IP addresses are not flushed, until a positive response is received, when the field is set. In an implementation, the cached resolved IP addresses are renewed relative to time to live expiry. In an implementation, determination of the type uses the requested domain name. In an implementation, determination of the type uses a type of DNS client device. In an implementation, determination of the type uses application associated with the requested FQDN. In an implementation, determination of enhanced DNS response caching parameter enablement uses a type of requesting device. In an implementation, a default setting for the field is enabled for certain types of applications, certain types of DNS client devices, certain types of FQDNs, certain types of requesting devices or combinations thereof.

In general, a domain name system (DNS) device includes a DNS client configured to issue DNS queries to DNS servers, a memory configured to store resolved Internet Protocol (IP) addresses, time to live values associated with the stored resolved IP addresses, and an enablement flag, where setting the enablement flag allows use of stored resolved IP addresses, and a processor in cooperation with the DNS client and memory configured to check for a stored resolved IP address corresponding to a domain name request, determine a type associated with the domain name request, set the enablement flag based on the type, and send an expired identified stored resolved IP address to process the domain name request when a response failure occurs for a query related to the identified stored resolved IP address. In an implementation, the processor further configured to not flush, until a positive response is received, expired stored resolved IP addresses when the enablement flag is set.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for enhanced domain name system (DNS) response caching, the method comprising:
    receiving a connection request for a fully qualified domain name (FQDN);
    checking a local cache for a cached resolved domain name corresponding to the requested FQDN;
    sending a query to refresh a matching cached resolved domain name;
    receiving a negative response or no response for the query;
    determining whether an enhanced DNS response caching parameter is enabled by using at least a type of DNS client device; and
    sending, to process the connection request, an expired matching cached resolved domain name when the enhanced DNS response caching parameter is enabled.

2. The method of claim 1, the method further comprising:
  storing cached resolved domain names in the cache for time to live values specified in resolved domain name responses.

3. The method of claim 2, the method further comprising:
  maintaining, until a positive response is received, expired cached resolved domain names when the enhanced DNS response caching parameter is enabled.

4. The method of claim 2, wherein the cached resolved domain names are refreshed when time to live values expire or are about to expire.

5. The method of claim 1, wherein determination of enhanced DNS response caching parameter enablement uses type of the requested FQDN.

6. The method of claim 1, wherein determination of enhanced DNS response caching parameter enablement uses type of requesting device.

7. The method of claim 1, wherein determination of enhanced DNS response caching parameter enablement uses type of application associated with the requested FQDN.

8. The method of claim 1, wherein a default setting for the enhanced DNS response caching parameter is enabled for certain application types, certain DNS client device types, certain types of requesting devices, certain FQDN types or combinations thereof.

9. A method for processing requests with domain name system (DNS) response failures, the method comprising:
  checking for a cached resolved Internet Protocol (IP) address corresponding to a domain name in a request;
  determining a type associated with the request by using an application type associated with the request when a response failure occurs for a query related to an identified cached resolved IP address;
  setting a field based on the type to permit use of expired identified cached resolved IP address; and
  sending the expired identified cached resolved IP address to process the request.

10. The method of claim 9, the method further comprising:
  storing cached resolved IP addresses in the cache for time to live values specified in resolved IP responses.

11. The method of claim 10, the method further comprising:
  not flushing, until a positive response is received, expired cached resolved IP addresses when the field is set.

12. The method of claim 10, the method further comprising:
  renewing the cached resolved IP addresses relative to time to live expiry.

13. The method of claim 9, wherein determination of the type uses the requested domain name.

14. The method of claim 9, wherein determination of the type uses type of DNS client device.

15. The method of claim 9, wherein determination of the type uses type of requesting device.

16. The method of claim 9, wherein a default setting for the field is enabled for certain types of applications, certain types of DNS client devices, certain types of FQDNs, certain types of requesting devices or combinations thereof.

17. A domain name system (DNS) device comprising:
  a DNS client configured to issue DNS queries to DNS servers;
  a memory configured to:
    store resolved Internet Protocol (IP) addresses;
    time to live values associated with the stored resolved IP addresses; and
    an enablement flag, wherein setting the enablement flag allows use of stored resolved IP addresses; and
  a processor in cooperation with the DNS client and memory configured to:
    check for a stored resolved IP address corresponding to a domain name request;
    determine a type associated with the domain name request by checking type of requesting device;
    set the enablement flag based on the type; and
    send an expired identified stored resolved IP address to process the domain name request when a response failure occurs for a query related to the identified stored resolved IP address.

18. The DNS device of claim 17, the processor further configured to:
  not flush, until a positive response is received, expired stored resolved IP addresses when the enablement flag is set.

* * * * *